United States Patent [19]

Claassen

[11] Patent Number: 5,056,687

[45] Date of Patent: Oct. 15, 1991

[54] SLIT NOZZLE

[75] Inventor: Henning J. Claassen, Lüneburg, Fed. Rep. of Germany

[73] Assignee: Corporation Nordson, Westlake, Ohio

[21] Appl. No.: 416,747

[22] Filed: Oct. 3, 1989

[30] Foreign Application Priority Data

Oct. 4, 1988 [DE] Fed. Rep. of Germany ... 8812493[U]

[51] Int. Cl.[5] ........................ B05B 1/04; B29C 47/14; B29C 65/52; B29C 41/12

[52] U.S. Cl. ................................ 222/146.5; 222/559; 239/134; 239/583; 239/597; 118/410

[58] Field of Search ..................... 222/146.5, 504, 559; 239/133, 134, 135, 597, 583, 104, 590.3; 118/410, 411

[56] References Cited

U.S. PATENT DOCUMENTS

| | | | |
|---|---|---|---|
| 3,126,574 | 3/1964 | Fox | 118/411 |
| 3,348,520 | 10/1967 | Lockwood | 239/135 |
| 4,048,950 | 9/1977 | Rakowicz et al. | 118/411 |
| 4,613,078 | 9/1986 | Marshall | 239/583 |
| 4,667,879 | 5/1987 | Muller | 239/133 |
| 4,774,109 | 9/1988 | Hadzimihalis et al. | 118/410 |
| 4,798,163 | 1/1989 | Claassen | 118/419 |

FOREIGN PATENT DOCUMENTS

| | | |
|---|---|---|
| 3223999A1 | 2/1983 | Fed. Rep. of Germany . |
| 3635481C1 | 2/1988 | Fed. Rep. of Germany . |
| WO88/01542 | 3/1988 | PCT Int'l Appl. . |

*Primary Examiner*—Andres Kashnikow
*Assistant Examiner*—Karen B. Merritt
*Attorney, Agent, or Firm*—Armstrong, Nikaido, Marmelstein, Kubovcik & Murray

[57] ABSTRACT

A slit nozzle for applying to a substrate a liquid high-polymer material, in particular a hot-melt adhesive on the basis of polyurethane, including a nozzle body and a controllable shut-off valve integrated into the nozzle body, wherein the liquid high-polymer material flows in a substantially straight path from the shut-off valve through a short passage into a spreading chamber which is connected to an exit slit.

14 Claims, 2 Drawing Sheets

SLIT NOZZLE

BACKGROUND OF THE INVENTION

1. Field of the Invention

The invention relates to a slit nozzle for applying to a substrate liquid high-polymer material, in particular a hot-melt adhesive based on polyurethane, comprising a nozzle body, a supply passage for the liquid material in the nozzle body, a controllable shutoff valve, a spreading chamber adjoining the supply passage and an exit slit connected to the spreading chamber.

2. Description of the Prior Art

A slit nozzle is disclosed in German patent specification 3,541,784 and comprises a nozzle body, a supply passage for the liquid material in the nozzle body, a controllable shut-off valve in the supply passage, a spreading chamber adjoining the supply passage in the flow direction and an exit slot connected to the spreading chamber so that a closed layer of liquid high-polymer material can be applied to the substrate to be coated, usually a web moving past and beneath the nozzle body.

With this slit nozzle difficulties occur when, during intermittent operation, high switching frequencies have to be reached because then the desired satisfactory cut-off at the exit nozzle is no longer ensured. The material applied to the substrate to be coated then exhibits unpleasant patterns which can lead to problems in further handling.

A further difficulty occurs in the application of hot-melt adhesive based on polyurethane, on contact with water, in particular at high air humidity, such a hot-melt adhesive can react very rapidly ("cracking") so that here very short processing times are desired.

SUMMARY OF THE INVENTION

The invention is thus based on the problem of providing a slit nozzle of the type indicated in which the aforementioned disadvantages do not occur.

In particular, a slit nozzle is proposed which firstly ensures a satisfactory cut-off and secondly substantially prevents the premature curing of the liquid high-polymer material.

The invention therefore proposes a slit nozzle for applying to a substrate liquid high-polymer material, in particular a hot-melt adhesive with a polyurethane base, comprising a nozzle body and a controllable shut-off valve integrated into the nozzle body, wherein the liquid high-polymer material flows in a substantially straight path from the shut-off valve through a short passage into a spreading chamber, which is connected to an exit slit.

The advantages achieved with the invention are based on the knowledge that the hitherto usual long flow paths from the shut-off valve in the application head to the exit slit influence the flow of the liquid material to such a great extent that the desired perfect cut-off is no longer ensured. It is therefore proposed to make the short passage end in the immediate vicinity of the exit slit, that is in the nozzle body, so that the liquid material emerging from the short passage immediately enters the spreading chamber and thus the exit slit, i.e. any relevant influencing of the flow process along this short path can be excluded. This flow arrangement provides defined conditions which in turn lead to perfect a cut-off.

A contribution to this is also the fact that exactly defined temperature conditions can be set and the liquid high-polymer material in the short passage immediately enters the spreading chamber and thus the exit slit, i.e. any relevant influencing of the flow process along this short path can be excluded. This flow arrangement provides defined conditions which in turn lead to a perfect cut-off.

A contribution to this is also the fact that exactly defined temperature conditions can be set and the liquid high-polymer material passes with a defined temperature from the short passage via the spreading chamber into the exit slit as is essential for perfect operation, in particular intermittent operation.

The liquid high-polymer material flows in a straight line through the short passage with the shut-off valve into the spreading chamber and is only then deflected into the exit slit so that practically no dead spaces exist and thus the curing of amounts of relevant material in such dead spaces is excluded.

Thus, the shut-off valve is not connected in its own application head to the nozzle body as in the prior art but in the nozzle body itself, thus providing a very compact construction. This spatial arrangement contributes to the liquid high-polymer material being able to pass without appreciable bends from the short passage via the spreading chamber into the exit slit. It has been found favourable to make the distance between the shut-off point on the one hand and the entrance into the distribution channel on the other hand at the most 50 mm; very good results are obtained with a distance of about 25 mm.

Fundamentally, for this slit nozzle the basic structure of the nozzle body known from German Patent Specification 3,541,784 can be used, i.e. in particular the basic structure from two parts which are connected with each other, in particular are screwed together. The short passage with the shut-off valve extends through one nozzle body part while the exit slit is located in the boundary faces between the two parts and is formed either by a so-called "metal mask plate" or by a milled-out portion in one of the two faces of the two nozzle body parts. The spreading chamber can be located either in the same nozzle body part as the short passage or in the other nozzle body part. It is only necessary to ensure that the liquid high-polymer material flows in as straight a line as possible from the short passage via the spreading chamber into the exit slit.

BRIEF DESCRIPTION OF THE DRAWINGS

The invention will be explained hereinafter in detail with the aid of an example of embodiment with reference to the accompanying schematic drawings, wherein.

DESCRIPTION OF THE PREFERRED EMBODIMENT

Figure 1:
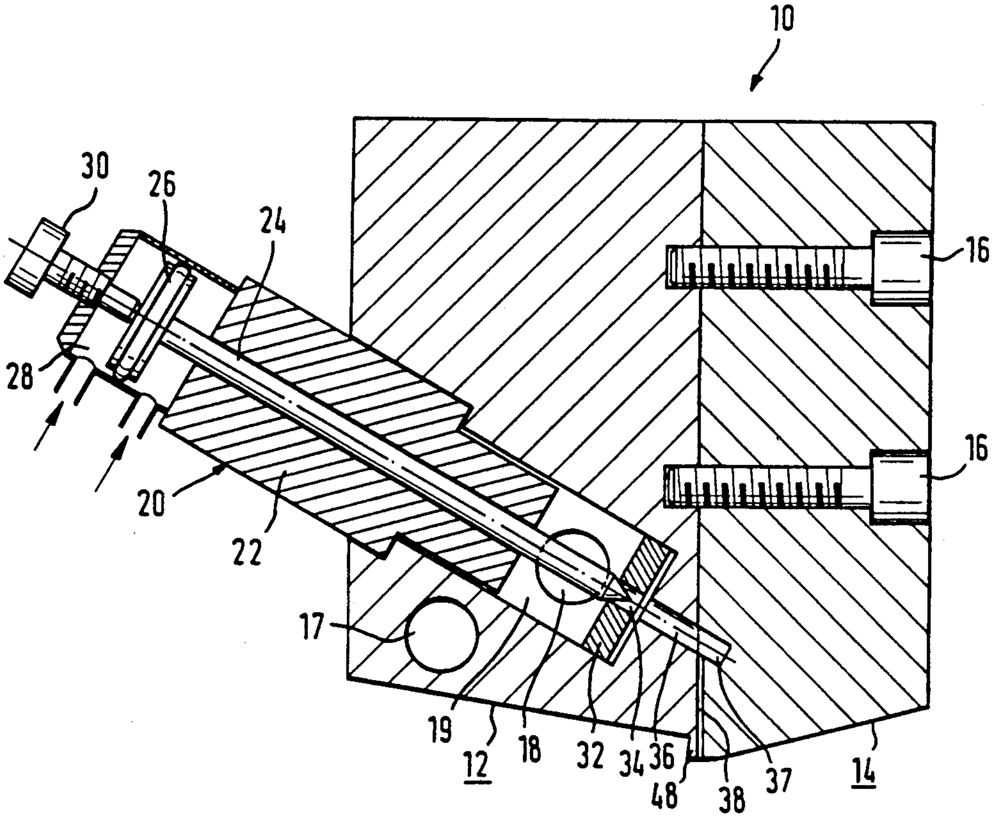
FIG. 1 shows a vertical section through the slit nozzle.

The slit nozzle shown in FIG. 1 and denoted generally by the reference numeral 10 comprises a nozzle body which consists of two plate-shaped parts 12 and 14 which are screwed together. In FIG. 1 two connecting screws 16 can be seen, the heads of which are countersunk into the surface of the part 14.

The nozzle body is provided with bores in which heating cartridges are located. Such a bore is indicated by the reference numeral 17. As a rule a plurality of heating bores with heating cartridges are provided in both parts 12, 14.

Extending through one of the two parts 12, 14, the part 12 in the embodiment illustrated is a transverse supply passage 18 which runs perpendicularly to the section plane in FIG. 1, has a circular cross-section and is connected to a melting apparatus (not shown) which melts the high-polymer material, which as a rule is originally solid or at least highly viscous, being in particular a hot-melt adhesive based on polyurethane, and supplies the liquified material under pressure to the transverse supply passage 18.

Several bores extend at a right-angle to the transverse supply passage 18, and into the bores shut-off valves 20 are inserted. Although in the sectional illustration of FIG. 1 only one shut-off valve 20 is shown, as a rule a plurality of shut-off valves 20 are used, as can also be seen from FIG. 2 which indicates a total of four shut-off valves 20.

Each shut-off valve 20 consists of a valve body 22 which is inserted into the bore of the part 12 and in which a valve needle 24 can be reciprocated. The valve needle 24 is provided at its upper end with a piston 26 which is located in a piston chamber 28. The piston chamber comprises two compressed air ports to which compressed air is alternately supplied in the direction of the arrows. As a result the two faces of the piston 26 are subjected alternately to compressed air so that the piston 26 and thus the valve needle 24 is pneumatically reciprocated.

At the upper end of the shut-off valve 20 there is an adjusting knob 30 for the stroke of the valve needle 24.

Since the valve body 22 terminates somewhat above the transverse supply passage 18, a hole surrounding the transverse supply passage 18 is formed and the bottom thereof is covered with an exchangeable plate-like seat 32 for the valve needle 24. The seat 32 comprises a bore 34 aligning with the bore for the valve needle 24 in the valve body 22 so that the tip of the valve needle 24 at one end of its stroke penetrates into the bore 34 in the seat 32 and closes the latter. This position is indicated in FIG. 1.

At the other end of its stroke, the valve needle 24 frees the bore 34 in the seat 32 so that the liquid high-polymer thermoplastic material can flow from the transverse supply passage 18 via the hole 19 into the bore 34 of the seat 32.

In the direction of movement of the valve needle 24, i.e. in alignment with the bore in the valve 22 and the bore 34 in the seat 32, a short passage 36 in the part 12 follows and terminates in the end face of the part 12 facing the part 14.

In the end face of the part 14 opposite the short passages 36 of the part 12, there is an elongated spreading chamber 37 which extends over almost the entire length of the nozzle body consisting of the two parts 12, 14 and is also in alignment with the short passages 36. The liquid high-polymer thermoplastic material can flow in a straight line from the hole 19 via the bore 34 in the seat 32 and the short passage 36 in the part 12 into the spreading chamber 37. The liquid is thereby distributed uniformly over almost the entire length of the nozzle body 12, 14.

Between the two engaging end faces of the two parts 12, 14 the actual exit slit 38 is disposed which in the embodiment illustrated is formed by a milled-out portion in the end face of the part 14.

Alternatively, it is also possible to provide this milled-out portion in the end face of the part 12. Finally, the slit can also be formed by a so-called "metal mask plate", i.e. a piece of sheet metal clamped between the two parts 12, 14 and having a cutout forming the slit.

In each case the slit 38 extends from the lower edge of the nozzle body 12, 14 upwardly to the spreading chamber 37.

The lower faces of the two parts 12, 14 are bevelled in the usual manner. In addition, the lower edge of the left part 12 facing the exit slit 38 is drawn forward somewhat (at 48) to form a cut-off edge.

From a liquefying apparatus and via the transverse supply passage 18 the slit nozzle 10 receives under pressure the liquefied high-polymer thermoplastic material, in particular a hot-melt adhesive based on polyurethane. From the transverse supply passage 18, the material passes into the various holes 19 and is blocked there under pressure because, in the position shown in FIG. 1, the tip of the valve needle 24 is located in the exit bore 34 of the seat 32 so that the short passage 36 is thus blocked.

By pneumatic action on the face of the piston 26 facing the valve body 22, the piston 26 is moved pneumatically upwardly so that the valve needle 24 moves upwardly and thus frees the bore 34 so that the liquid high-polymer thermoplastic material can now pass through the bore 34 in the seat 32 and through the short passage 36 and the spreading chamber 37 over the entire length into the exit slit 38.

By applying compressed air to the face of the piston 26 remote from the valve body 22, the valve needle 32 is again displaced downwardly and the bore 34 is thereby blocked so that the application of the high-polymer material is interrupted.

Figure 2:
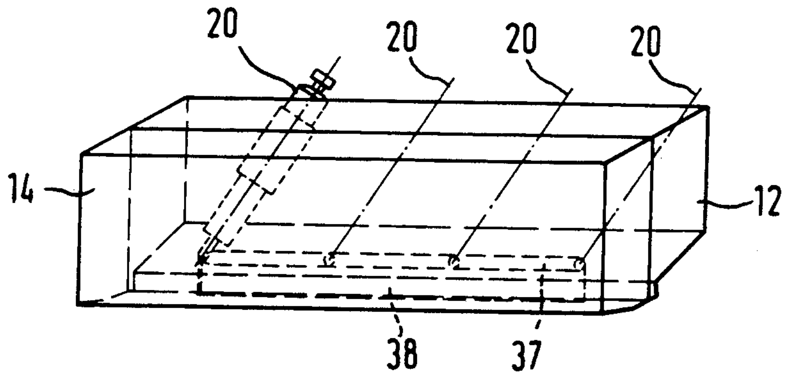
FIG. 2 is a perspective view of the slit nozzle.

In accordance with the illustration in FIG. 2, a plurality of valves may be provided, a total of four in the embodiment illustrated, each of which supplies parts of the spreading chamber 37 with the liquid high-polymer material.

As an alternative to the embodiment illustrated, the spreading chamber 37 may also be located in the end face of the part 12. All that is essential is that the liquid high-polymer material coming from the individual short passages 36 is distributed uniformly over the entire length of the spreading chamber 37 and thus of the exit slit 38.

After exiting the transverse supply passage 18, the material flows in a straight line on a short path from the hole 19 through the bore 34 and short passage 36 into the spreading chamber 37. The bend on transition from the spreading chamber 37 into the slit 38 is also only slight because the short passage 36 and slit 38 extend at an angle of 120° to each other.

Figure 3:
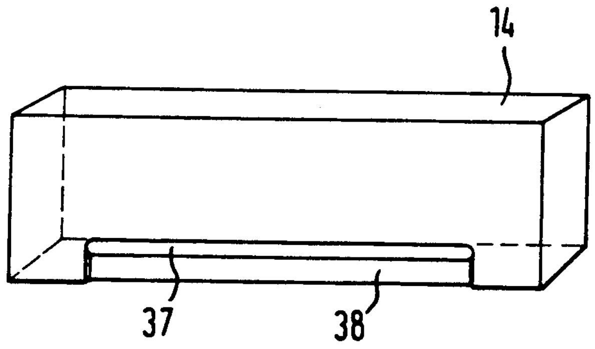
FIG. 3 is a perspective view of one part of the nozzle body.

In FIG. 3 the part 14 with the spreading chamber 37 and the milled-out portion in the end face of the part 14 forming the exit slit 38 are illustrated.

FIG. 2 shows a perspective side view of the nozzle body with the two parts 12, 14, four schematically indicated shut-off valves 20, the spreading chamber 37 and the exit slit 38.

I claim:

1. A slit nozzle for applying to a substrate liquid high-polymer material, in particular a hot-melt adhesive with a polyurethane base, comprising:

a nozzle body including, at least one bore, a supply passage extending perpendicular to said at least one bore, a spreading chamber, a short passage and an exit slit, said nozzle body consists of two parts which are connected with each other, said exit slit is formed between engaging faces of said parts, said spreading chamber is located in said engaging face of one of the two parts; and a controllable shut-off valve disposed inside the nozzle body in said at least one bore, wherein the liquid high-polymer material flows in a substantially straight path from the controllable shut-off valve through the short passage into the spreading chamber which is connected to the exit slit.

2. A slit nozzle according to claim 1, wherein the controllable shut-off valve comprises a valve body integrated into the nozzle body and having a pneumatically reciprocatable valve needle.

3. A slit nozzle according to claim 2, wherein the valve body is inserted into the at least one bore of the nozzle body which is connected to the supply passage.

4. A slit nozzle according to claim 3, wherein in the at least one bore of the nozzle body an exchangeable seat for the valve needle is located.

5. A slit nozzle according to claim 1, wherein the supply passage is for the liquid high-polymer material and the supply passage extends at a right-angle to the short passage.

6. A slit nozzle according to claim 1, wherein a distance between the controllable shut-off valve and an entrance into the spreading chamber is at most 50 mm, in particular at most 25 mm.

7. A slit nozzle according to claim 1, wherein the nozzle body includes a plurality of short passages, each of which opens into the spreading chamber.

8. A slit nozzle according to claim 1, wherein the slit nozzle forms an angle of more than 90°, in particular in a range from 110° to 150°, with the short passage.

9. A slit nozzle according to claim 1, wherein the exit slit is formed by at least one of a milled-out portion in one of said engaging faces of the two parts and a metal mask plate.

10. A slit nozzle according to claim 1, wherein the at least one bore for the controllable shut-off valve and said short passage are adjoining and are located in one of the two parts of the nozzle body.

11. A slot nozzle for applying liquid high polymer material to a substrate, in particular hot melt polyurethane adhesive, comprising:

a nozzle body having an elongated discharge slot, a spreading chamber in communication with said discharge slot for distribution therealong prior to discharge from said slot nozzle, a plurality of bores, a supply passage extending transverse to said plurality of bores, a plurality of controllable shut-off valves located within said plurality of bores to receive material from said supply passage, said controllable shut-off valves having valve seats located in close proximity to and in fluid communication with said spreading chamber and located along a line parallel to a length of said discharge slot, said supply passage extending within said nozzle body parallel to said valve seats wherein the liquid high polymer material flows in a short direct path from said controllable shut-off valve into said spreading chamber and to said discharge slot when said controllable shut-off valves are opened.

12. A slot nozzle as claimed in claim 11 in which said nozzle body comprises first and second portions clamped together to form said discharge slot therebetween.

13. A slot nozzle as claimed in claim 12, wherein said supply passage is located within one of said first and second portions to supply material to said controllable shut-off valves.

14. A slot nozzle as claimed in claim 12, wherein said controllable shut-off valves and said supply passage are both located within one of said first and second portions.

* * * * *